(12) United States Patent
Farah et al.

(10) Patent No.: US 11,286,882 B2
(45) Date of Patent: Mar. 29, 2022

(54) EXHAUST CASING FOR A GAS TURBINE ENGINE

(71) Applicant: PRATT & WHITNEY CANADA CORP., Longueuil (CA)

(72) Inventors: Assaf Farah, Brossard (CA); Marc Tardif, Candiac (CA); Daniel Summers-Lepine, St-Bruno-de-Montarville (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 203 days.

(21) Appl. No.: 16/202,788

(22) Filed: Nov. 28, 2018

(65) Prior Publication Data

US 2020/0166004 A1 May 28, 2020

(51) Int. Cl.
*F02K 1/82* (2006.01)
*F01D 25/30* (2006.01)

(52) U.S. Cl.
CPC ............. *F02K 1/822* (2013.01); *F01D 25/30* (2013.01); *F05D 2240/15* (2013.01); *F05D 2260/20* (2013.01)

(58) Field of Classification Search
CPC . F02C 7/24; F01D 25/26; F01D 25/30; F01D 11/18; F01D 11/24; F05D 2240/15; F05D 2260/231; F05D 2260/38; F05D 2230/642; F02K 1/386; F02K 1/48; F02K 1/80; F02K 1/805; F02K 1/82; F02K 1/822; F02K 1/54–566; F02K 1/60–625; B64D 29/06
See application file for complete search history.

(56) References Cited

U.S. PATENT DOCUMENTS

| | | | | |
|---|---|---|---|---|
| 4,920,742 | A * | 5/1990 | Nash | F02K 1/82 60/799 |
| 6,511,284 | B2 * | 1/2003 | Darnell | F01D 25/162 415/115 |
| 9,279,368 | B2 | 3/2016 | Schubert | |
| 9,546,567 | B2 * | 1/2017 | Kasibhotla | F01D 25/125 |
| 9,976,442 | B2 | 5/2018 | Yeager et al. | |
| 9,982,564 | B2 | 5/2018 | Yeager et al. | |
| 10,006,306 | B2 | 6/2018 | Scott et al. | |
| 2015/0337687 | A1 * | 11/2015 | Scott | F01D 5/142 415/215.1 |

* cited by examiner

*Primary Examiner* — Stephanie Sebasco Cheng
(74) *Attorney, Agent, or Firm* — Norton Rose Fulbright Cananda LLP (57) ABSTRACT

An exhaust casing for a gas turbine engine comprises a shroud configured to surround an exhaust cone, and a heat shield attached to the shroud. The heat shield has a first end and a second end axially spaced apart from each other. A gap is defined radially between the shroud and the heat shield. The gap is configured to enclose at least a portion of an interface defined between at least one strut and the shroud. The exhaust casing is configured to surround the exhaust cone and configured to be connected to the exhaust cone via the at least one strut.

9 Claims, 7 Drawing Sheets

EXHAUST CASING FOR A GAS TURBINE ENGINE

TECHNICAL FIELD

The application relates generally to engine casings and, more particularly, to an exhaust casing for a gas turbine engine.

BACKGROUND OF THE ART

Exhaust ducts of gas turbine engines are subject to thermal stresses. In some applications, thermal gradients between the exhaust struts and the outer shroud of the exhaust duct may be increased by a flow of cooler air flowing over the outer shroud (e.g. air bypass flow). The thermal gradients can create areas of high stress at their interface, most notably at the strut leading and/or trailing edges. High stresses are known to reduce the exhaust duct low-cycle fatigue life. As such, metal thickness of the exhaust duct may be increased to provide an acceptable durability. However, this, in turn, increases the overall weight of the exhaust system.

SUMMARY

In one aspect, there is provided a turbine exhaust section for a gas turbine engine, the turbine exhaust section comprising a core duct defined between an inner shroud and an outer shroud extending axially along a longitudinal axis; at least one strut extending through the core duct from the outer shroud to the inner shroud, the at least one strut having a leading edge and a trailing edge; and a heat shield radially outwardly spaced from the outer shroud, the outer shroud having a first end and a second end axially spaced apart from each other along the longitudinal axis, the first end and the second end contacting the outer shroud, a gap defined radially between the outer shroud and the heat shield from the first end to the second end, the gap configured to provide a thermal air barrier, the heat shield spanning at least over one edge of the leading and trailing edges.

In another aspect, there is provided an exhaust casing for a gas turbine engine, the exhaust casing configured for surrounding an exhaust cone of the gas turbine engine and configured to be connected to the exhaust cone via at least one strut, the exhaust casing comprising a shroud configured to surround the exhaust cone; and a heat shield attached to the shroud, the heat shield having a first end and a second end axially spaced apart from each other along a longitudinal axis, a gap defined radially between the shroud and the heat shield relative to the longitudinal axis and axially between the first end and the second end along the longitudinal axis, the gap configured to enclose at least a portion of an interface defined between the at least one strut and the shroud.

In a further aspect, there is provided a method for thermally insulating an interface defined between a strut and a shroud of a gas turbine engine, the strut connecting the shroud to an exhaust cone, the method comprising flowing a core flow from a combustor in a core duct defined between the exhaust cone and the shroud; flowing a bypass flow from an inlet of the gas turbine engine in a bypass duct surrounding the core duct; and providing an air barrier layer at the interface between the core flow and the bypass flow thereby insulating the interface from the bypass flow.

DESCRIPTION OF THE DRAWINGS

Reference is now made to the accompanying figures in which.

DETAILED DESCRIPTION

Figure 1:
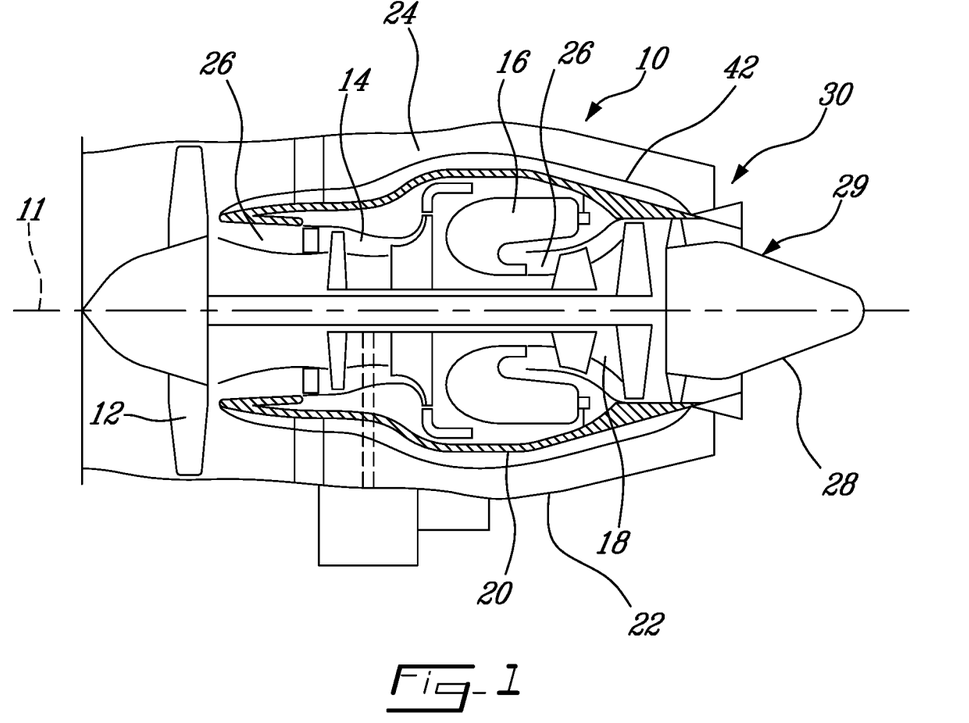
FIG. 1 is a schematic cross-sectional view of a gas turbine engine.

FIG. 1 illustrates a gas turbine engine 10 of a type preferably provided for use in subsonic flight, generally comprising in serial flow communication along a longitudinal axis 11 a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases.

The gas turbine engine 10 includes a core engine casing 20 which encloses the turbo machinery of the engine, and an outer casing 22 disposed radially outwardly of the core engine casing 20 such as to define an annular bypass passage 24 therebetween. The air propelled by the fan 12 is split into a first portion which flows around the core engine casing 20 within the bypass passage 24, and a second portion which flows through the core of the engine via a main gas path 26, which is circumscribed by the core engine casing 20 and allows the flow to circulate through the multistage compressor 14, combustor 16 and turbine section 18 as described above. An annular casing 42 may be provided between the core engine casing 20 and the outer casing 22. In operation, a low-speed cooling air may flow between the core engine casing 20 and the annular casing 42. This low-speed cooling flow may provide cooling to components mounted on the core engine casing 20 and purges a cavity between the core engine casing 20 and the annular casing 42. The air temperature of this cooling flow may be between an engine core flow temperature and a bypass flow temperature.

At an aft end of the engine 10, an exhaust cone 28 is centered about, and axially extends along, the longitudinal axis 11 of the engine 10. The exhaust cone 28 is connected to an aft end of the turbine section 18. The exhaust cone 28 has an outer surface 29 which defines an inner wall of the main gas path 26 so that the combustion gases flow therearound.

Figure 2A:
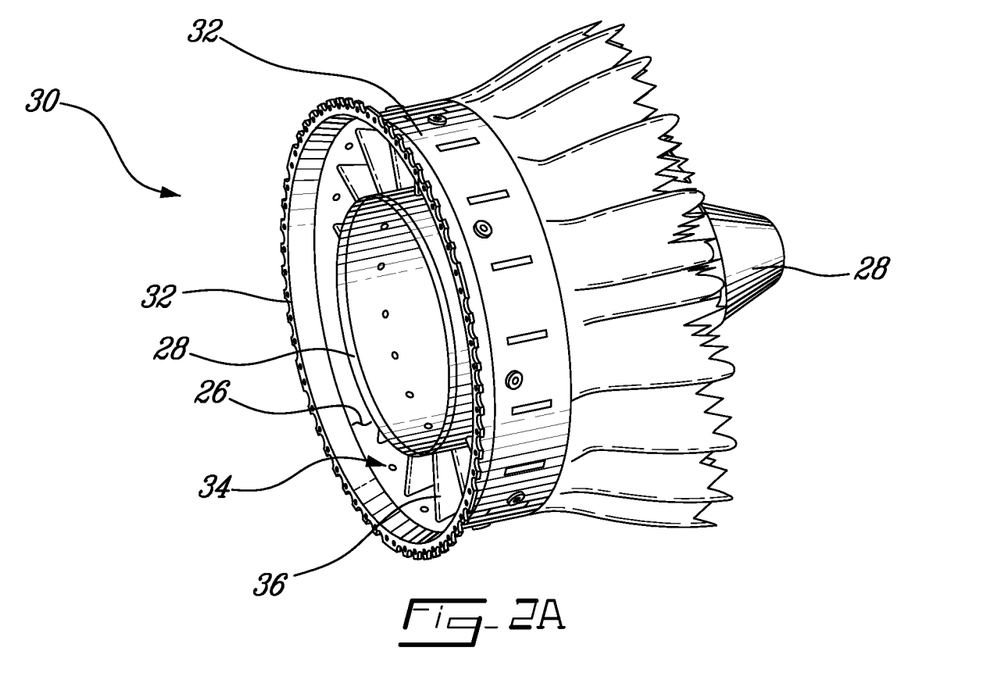
FIG. 2A is a perspective view of an exhaust section of the gas turbine engine of FIG. 1.

Referring to FIG. 2A, the gas turbine engine 10 includes an exhaust section 30 for channeling the combustion gases to an exhaust outlet. The exhaust section 30 includes an outer shroud 32 surrounding an inner shroud (e.g. the exhaust cone 28). The shroud 32 may be referred to as an "exhaust outer shroud". In some embodiments, the shroud 32 may form a continuation of the core engine casing 20. A core duct 34 is defined radially relative to the longitudinal axis 11 between the exhaust cone 28 and the shroud 32 to provide the main gas path 26. The cooling flow may provide some cooling to the outer shroud 32 as it exists between the outer shroud 32 and the annular casing 42 and may mix with the bypass flow in the bypass passage 24.

The exhaust section 30 includes one or more struts 36 extending radially in the core duct 34. In the embodiment shown in FIG. 2A, the strut 36 abuts the exhaust cone 28 and the shroud 32 to interconnect the exhaust cone 28 and the shroud 32 together. For example, the exhaust section 30 may include a series of circumferentially spaced apart struts 36 interconnecting the exhaust cone 28 and the shroud 32. The struts 36 may be disposed circumferentially equidistant from each other about the longitudinal axis 11.

Figure 2B:
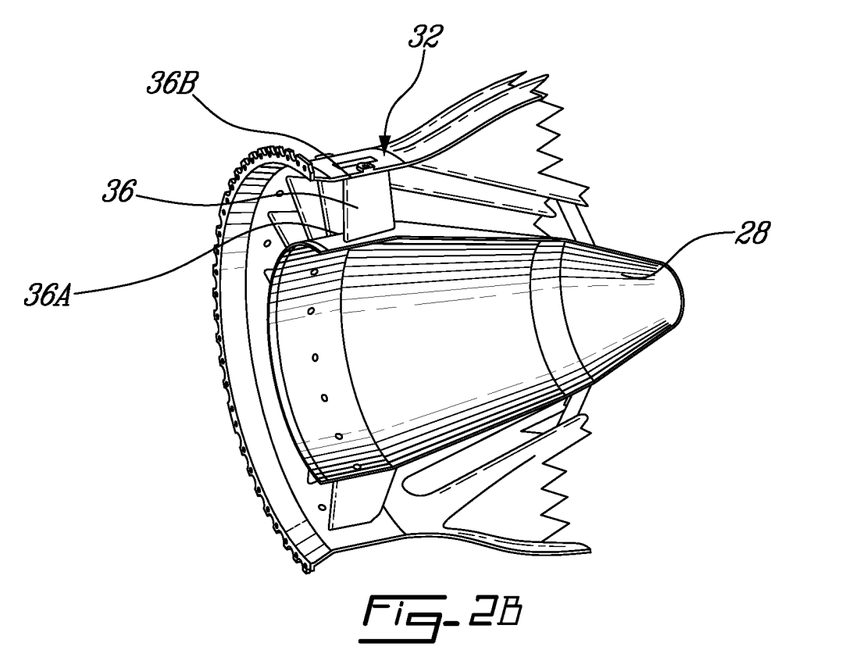
FIG. 2B is a cross-sectional view of the exhaust section of FIG. 2A.

Referring to FIG. 2B, a cross-sectional view of the exhaust section 30 is shown. In the embodiment shown in FIG. 2B, the strut 36 has a root 36A physically connecting or abutting the exhaust cone 28 and a tip 36B physically connecting or abutting the shroud 32. As such, in operation, thermal growth from the exhaust cone 28 and thermal growth of the strut 36 may be transferred to the shroud 32 via the strut 36.

Figure 2C:
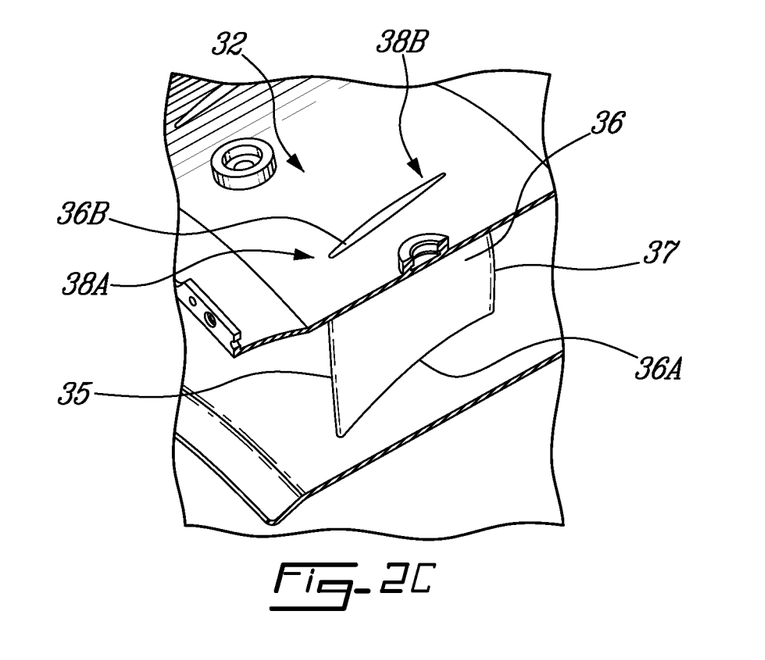
FIG. 2C is a top sectional view of the exhaust section of FIG. 2A.
Figure 2D:
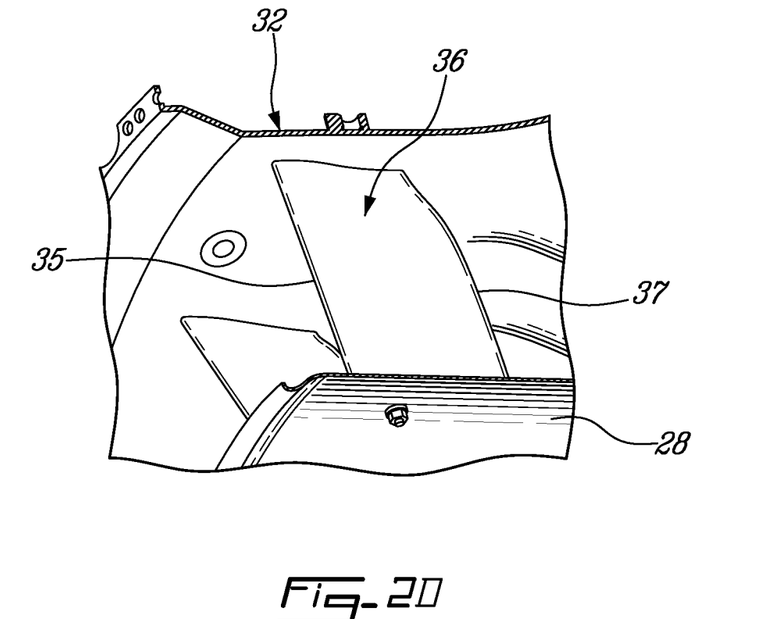
FIG. 2D is a side sectional view of the exhaust section of FIG. 2A.

FIG. 2C illustrates a top sectional view of the exhaust section 30 and FIG. 2D illustrates a side sectional view of the exhaust section 30. As shown in FIGS. 2C-2D, the strut 36 has a leading edge 35 and a trailing edge 37. The leading and trailing edges 35, 37 are axially spaced apart from each other along the longitudinal axis 11. During normal operation of the engine 10, the leading edge 35 is axially upstream of the trailing edge 37 relative to the flow of combustion gases in the core duct 34. As shown in FIGS. 2C-2D, the leading edge 35 physically abuts the shroud 32 and the exhaust cone 28. Similarly, the trailing edge 37 physically abuts the shroud 32 and the exhaust cone 28. As such, a first interface 38A may be defined between the leading edge 35 and the shroud 32 and a second interface 38B may be defined between the trailing edge 37 and the shroud 32. In other words, the shroud 32 may have a shroud surface abutting a leading edge surface of the strut 36 to form the first interface 38A. Similarly, the shroud surface may abut a trailing edge surface of the strut 36 to form the second interface 38B. The first interface 38A may refer to a first axial position along the shroud 32 and the second interface 38B may refer to a second axial position along the shroud 32. The first axial position being upstream of the second axial position relative to the longitudinal axis 11 of the gas turbine engine 10.

In use, the shroud 32 may be heated via the combustion gases flowing through the core duct 34. The strut 36 may be heated via the combustion gases flowing though the core duct 34 as well as from the exhaust cone 28 itself. As such, the strut 36 may thermally grow because of the heat or thermal energy transferred thereto from the exhaust cone 28. For example, the strut 36 may thermally grow because of its own operating temperature and because of the thermal growth of the heat or thermal energy transferred thereto from the exhaust cone 28 to which it is physically connected or abutted.

Figure 3A:
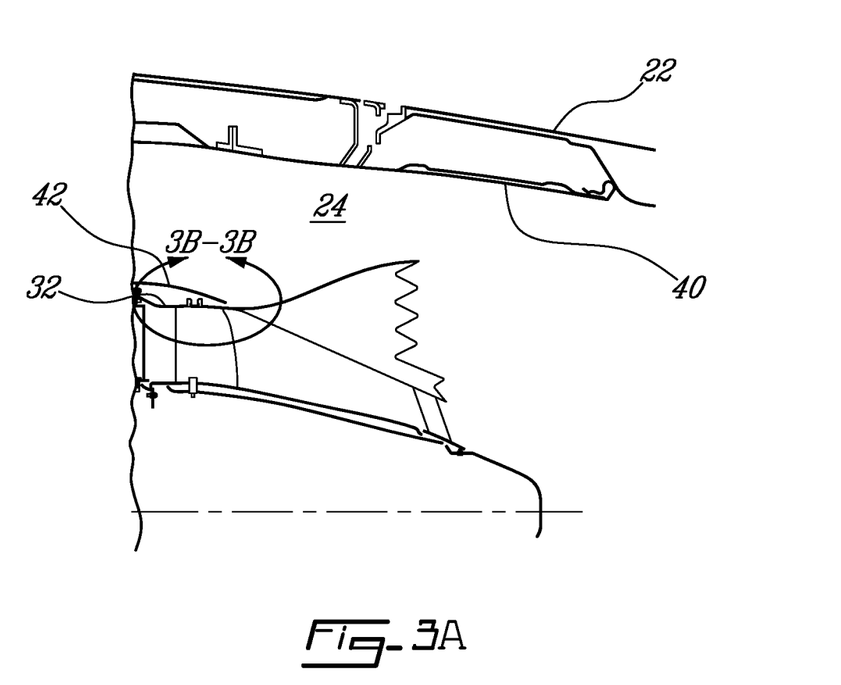
FIG. 3A is a schematic cross-sectional view of the exhaust section of FIG. 2A surrounded by a bypass duct of the gas turbine engine of FIG. 1.

Referring to FIG. 3A, the exhaust section 30 is shown surrounded by a bypass duct or bypass duct wall 40 of the an outer casing 22. In normal operation, the first portion of the intake air flowing in the bypass passage 24 and the cooling air flowing between the core engine casing 20 and the annular casing 42 are cooler than the second portion of the intake air flowing in the core duct 34. As such, the bypass flow and the cooling flow may cool the shroud 32 as they pass over the shroud 32.

Figure 3B:
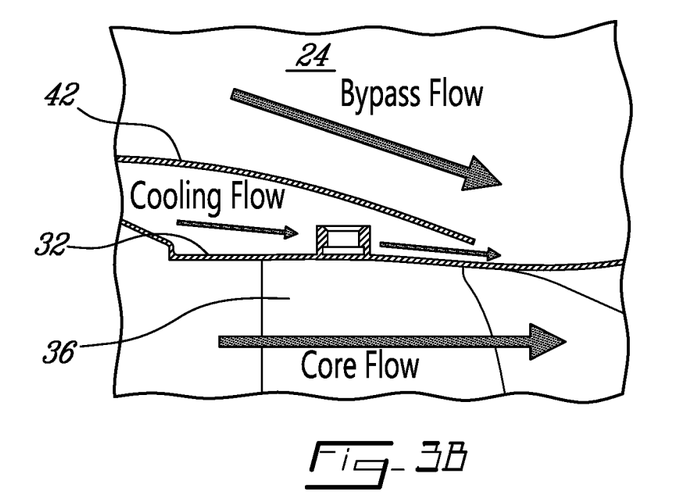
FIG. 3B is an enlarged view of a portion of FIG. 3A.

Referring to FIG. 3B, an enlarged view of a portion 3B-3B of FIG. 3A is shown. In the embodiment shown in FIG. 3B, an annular casing 42 surrounds at least a portion of the shroud 32. A part of the bypass flow may flow between the annular casing 42 and the shroud 32 to cool the shroud 32. The part of the bypass flow flowing between the annular casing 42 and the shroud 32 may be referred to as "cooling flow".

Figure 3C:
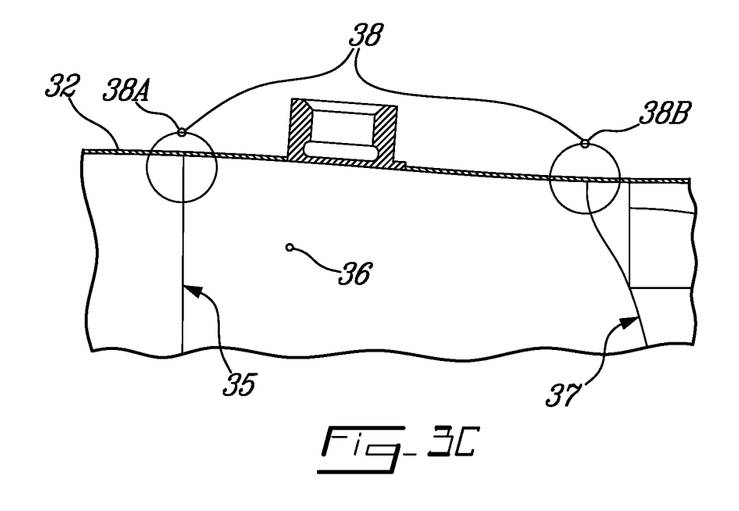
FIG. 3C is an enlarged view of a portion of FIG. 3B.

Referring to FIG. 3C, an enlarged portion of the shroud 32 and the strut 36 is shown. As mentioned above, the cooling flow may cool the shroud 32 as it passes over the shroud 32. However, in operation, the shroud 32 may be hotter at the interface 38 with the strut 36. In other words, the shroud 32 has hotter areas at, or near, the interface 38 that is defined between the shroud 32 and the strut 36 relative to other areas of the shroud 32 that are away from the interface 38. As such, the areas of the shroud 32 where the shroud 32 abuts or physically connect with the strut 36 may have increased thermal stresses relative to the other areas of the shroud 32 that are away from the interface 38. In some embodiments, the first interface 38A, the second interface 38B, or both interfaces 38A, 38B, may provide the areas of increased thermal stresses. For example, a hot surface adjacent a cold surface of the same part may produce thermal stresses. Thermal stress may refer to stress created by any change in temperature to a material. As such, a thermal insulation layer may be provided between the shroud 32 and the bypass flow to insulate the shroud 32 from the bypass flow. In other words, the thermal insulation layer may slow the cooling effect of the bypass flow on the shroud 32 and/or maintain the heat around the shroud 32. The thermal insulation layer may be an air barrier layer disposed between the shroud 32 and the bypass flow.

Figure 4A:
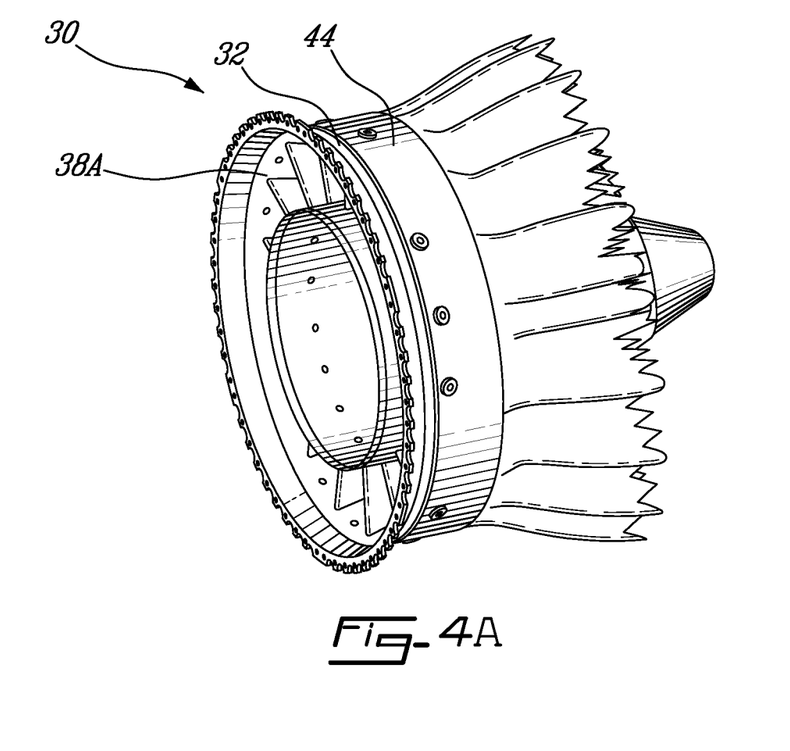
FIG. 4A is a perspective view of an exhaust section of the gas turbine engine of FIG. 1 according to some particular embodiments.

Referring to FIG. 4A, the exhaust section 30 includes a heat shield 44 attached to the shroud 32. The heat shield 44 may be suitably attached to the shroud 32 to isolates the shroud 32 from the cooling flow flowing around it. The heat shield 44 may refer to any suitable thermal protector providing the thermal insulation layer to insulate the shroud 32 from the bypass flow. For example, the heat shield 44 may be provided to form the air barrier layer between the shroud 32 and the bypass flow. The heat shield 44 may thus insulate the shroud 32 at the first interface 38A, at the second interface 38B, or at both interfaces 38A, 38B and the interface 38 therebetween. In the embodiment shown in FIG. 4A, the heat shield 44 is mounted about the shroud 32 and the struts 36. In other words, the heat shield 44 forms an annular thermal protector all around the shroud 32. In some embodiments, the heat shield 44 may not form a full circumference, and instead, may be mounted to insulate selected circumferential portions of the shroud 32.

Figure 4B:
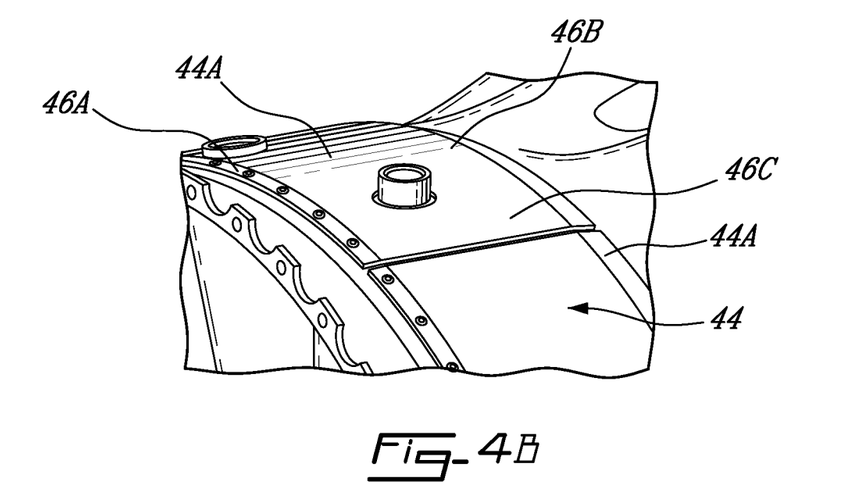
FIG. 4B is an enlarged portion of FIG. 4A.

Referring to FIG. 4B, the heat shield 44 is circumferentially segmented into at least two separate segments 44A. In other words, the heat shield 44 is split circumferentially. In operation, the split may allow the heat shield segments 44A to expand without producing increased thermal stresses relative to a full ring-shaped structure. The split may also facilitate assembly of the heat shield 44 on the shroud 32. In some embodiments, the heat shield 44 may be circumferentially segmented into three or more separate segments 44A about the shroud 32. The heat shield segments 44A may be equidistant from each other.

Figure 4C:
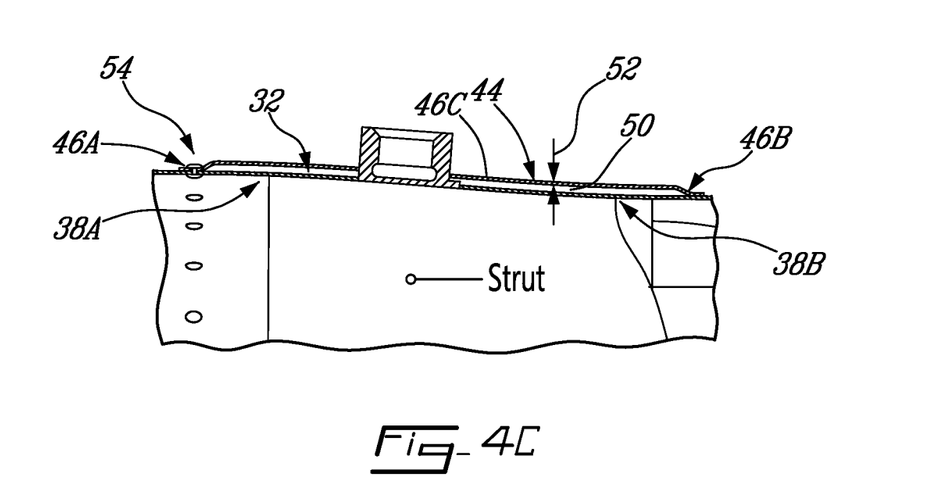
FIG. 4C is a schematic cross-sectional view of the exhaust section of FIG. 4A.

The heat shield 44 has a first end 46A and a second end 46B axially spaced apart from each other along the longitudinal axis 11. The heat shield 44 has a main portion 46C between the first and second ends 46A, 46B. As depicted in FIGS. 4A-4C, the first end 46A is positioned upstream of the second end 46B relative to the bypass flow in the bypass passage 24.

Referring to FIG. 4C, a gap 50 is defined radially between the shroud 32 and the heat shield 44 relative to the longitudinal axis 11. The gap 50 may be defined axially between the first end 46A and the second end 46B. In the embodiment shown in FIG. 4C, the heat shield 44 extends over the first interface 38A and the second interface 38B. In other words, the gap 50 encloses the first and second interfaces 38A, 38B. The first end 46A of the heat shield 44 is connected to the shroud 32 to attach the heat shield 44 to the shroud 32. In some embodiments, the heat shield 44 may be only attached to the shroud 32 via an attachment at the first end 46A. The first end 46A may be riveted, welded, and/or brazed to the shroud 32. The second end 46B of the heat shield 44 may rest on the shroud 32. For example, the second end 46B may biasly abut the shroud 32. That is, the second end 46B may be held adjacent to the shroud 32 by bias engagement. In other words, the second end 46B would biasly return to abut the shroud 32 if the second end 46B is raised from the shroud 32 by an external force and subsequently released. Thus, the second end 46B may not be attached to the shroud 32. In other words, the second end 46B may be allowed to slide on the shroud 32.

The heat shield 44 may have a thickness 52 that is suitable to withstand vibrations of the gas turbine engine 10. The thickness 52 being measured radially relative to the longitudinal axis 11. In some embodiments, the thickness 52 is at least 20 thou (or 20/1000 of an inch). In other embodiments, the thickness 52 is at most 40 thou. In some other embodiments, the thickness is between 20 thou and 40 thou.

The heat shield 44 may be formed from high temperature resistant materials. For example, the heat shield 44 may be formed from high temperature alloys, such as nickel alloys.

The shape of the heat shield 44 may be aerodynamic to limit the effects of the heat shield 44 on the bypass flow in the bypass duct 40. For example, the first end 46A may gradually extend from the shroud 32 to the main portion 46C. Similarly, the second end 46B may gradually extend from the main portion 46C to the shroud 32.

The shroud 32 and the heat shield 44 may be mounted together to form an exhaust casing 54. The exhaust casing 54 may be provided separately from the exhaust cone 28, the struts 36, and/or other parts of the gas turbine engine 10.

Figure 5A:
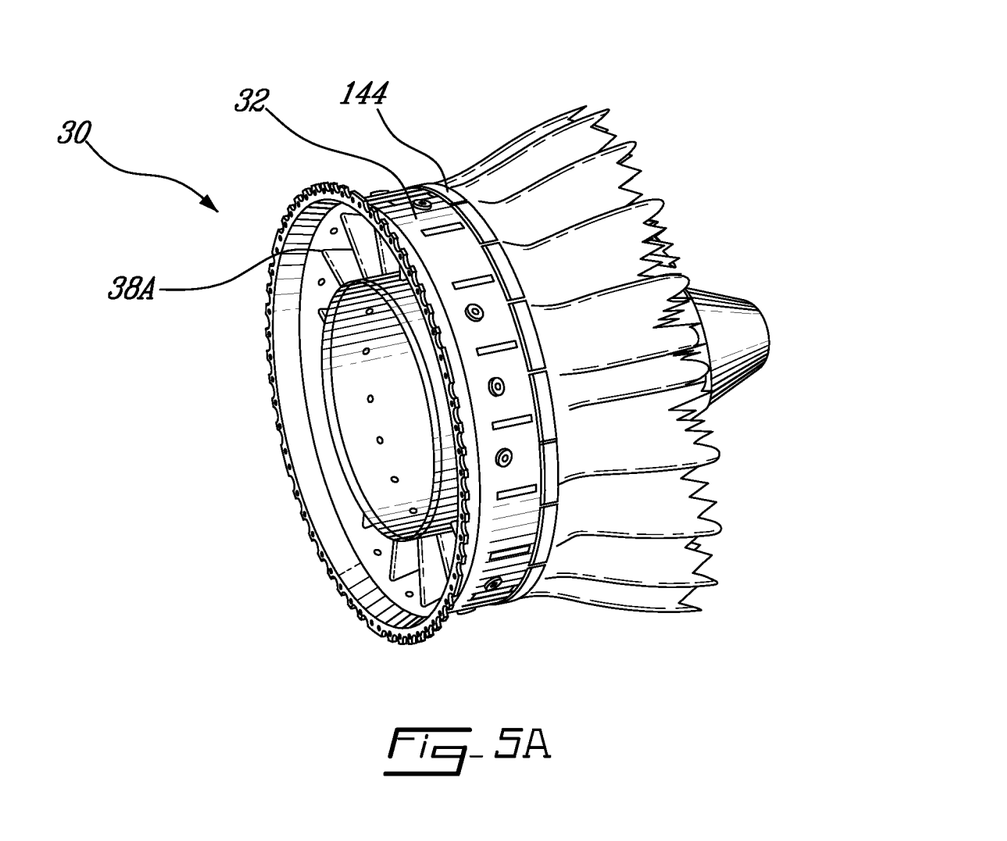
FIG. 5A is a perspective view of an exhaust section of the gas turbine engine of FIG. 1 according to some particular embodiments.
Figure 5B:
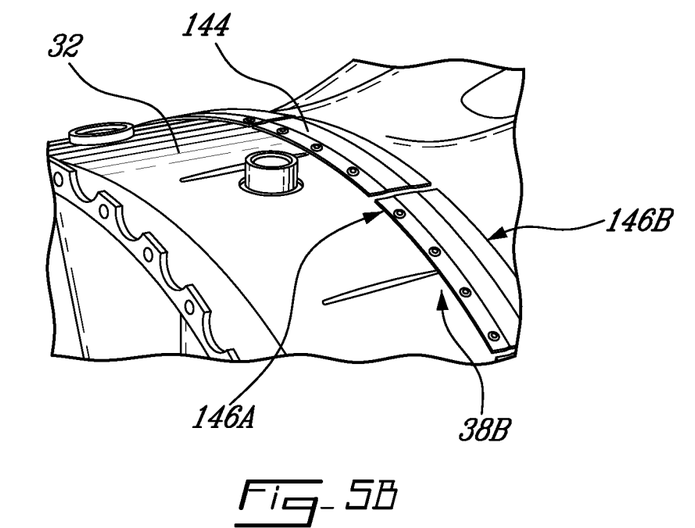
FIG. 5B is an enlarged portion of FIG. 5A.
Figure 5C:
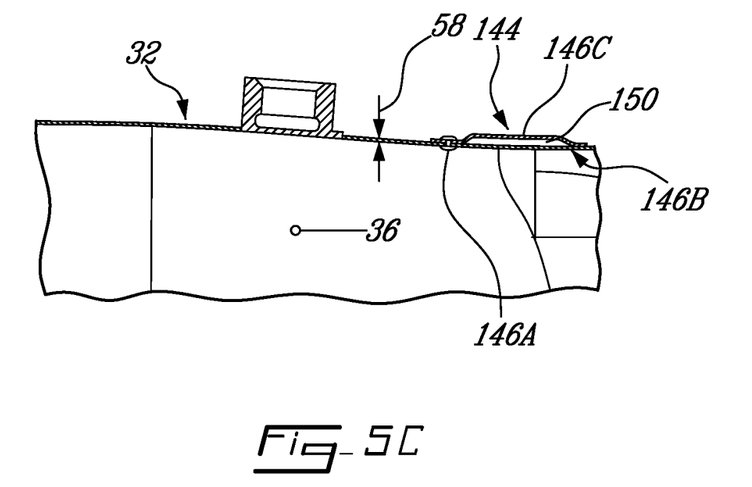
FIG. 5C is a schematic cross-sectional view of the exhaust section of FIG. 5A.

Referring to FIGS. 5A-5C, the exhaust section 30 includes a heat shield 144 similar to the heat shield 44 previously described. For example, the heat shield 144 may refer to the heat shield 44 except with an axially shorter main portion 146C extending between first and second ends 146A and 146B. The heat shield 144 may be suitably attached to the shroud 32 to isolates a portion of the shroud 32 from the cooling flow flowing around it. In the embodiment shown in FIG. 5C, the heat shield 144 extends over the second interface 38B without extending over the first interface 38A. In other words, the gap 150 encloses the second interface 38B. Other lengths of the heat shields 44, 144 may be provided to cover specific locations on the shroud 32.

In operation, the heat shield 44, 144 may reduce the temperature gradient at the shroud/strut 32/36 interface 38, 38A, 38B. This may reduce thermally-induced stresses, improve exhaust assembly durability, and reduce the weight of the assembly when compared to a solution that would simply increase the shroud thickness. As such, in some embodiments, the heat shield 44, 144 may allow the shroud thickness 58 of the exhaust casing 54 to be decreased.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. A turbine exhaust section for a gas turbine engine, the turbine exhaust section comprising:
   a core duct defined between an inner shroud and an outer shroud, each extending axially along a longitudinal axis;
   a bypass passage surrounding the core duct for directing a bypass flow of air;
   a plurality of circumferentially distributed struts extending through the core duct from the outer shroud to the inner shroud, each of the plurality circumferentially distributed struts having a leading edge and a trailing edge; and
   a circumferentially segmented heat shield encircling the outer shroud, the circumferentially segmented heat shield having a first end and a second end axially spaced apart from each other along the longitudinal axis, the first end fixedly attached to the outer shroud, the second end biased against the outer shroud and free to slide thereon in response to thermal growth, a gap defined radially between the outer shroud and the circumferentially segmented heat shield from the first end to the second end, the gap configured to provide a thermal air barrier, the circumferentially segmented heat shield shielding the outer shroud from the bypass flow of air flowing through the bypass passage around the outer shroud, the circumferentially segmented heat shield axially spanning over each leading edge of the plurality of circumferentially distributed struts and/or each trailing edge of the plurality of circumferentially distributed struts.

2. The turbine exhaust section of claim 1, wherein the circumferentially segmented heat shield is mounted to a radially outer surface of the outer shroud.

3. The turbine exhaust section of claim 1, wherein the circumferentially segmented heat shield axially extends from a first location upstream of the plurality of circumferentially distributed struts to a second location downstream of the plurality of circumferentially distributed struts relative to a flow of gases through the core duct.

4. The turbine exhaust section of claim 1, wherein the circumferentially segmented heat shield is circumferentially segmented into at least three segments.

5. The turbine exhaust section of claim 4, wherein the at least three segments form a full circumference about the outer shroud.

6. The turbine exhaust section of claim 4, wherein the at least three segments are equidistant from each other.

7. An exhaust casing for a gas turbine engine, the exhaust casing configured for surrounding an exhaust cone of the gas turbine engine and configured to be connected to the exhaust cone via a plurality of circumferentially spaced-apart struts, the exhaust casing comprising:
- a shroud configured to surround the exhaust cone, the shroud surrounded by a bypass passage for discharging a bypass flow of air; and
- a circumferentially segmented heat shield attached to the shroud for shielding the shroud from the bypass flow of air through the bypass passage, the circumferentially segmented heat shield having a first end and a second end axially spaced apart from each other along a longitudinal axis, the first end fixedly attached to the shroud, the second end biased against the shroud and free to slide thereon in response to thermal growth, a gap defined radially between the shroud and the circumferentially segmented heat shield relative to the longitudinal axis and axially between the first end and the second end along the longitudinal axis, the shroud having a respective interface with each strut of the plurality of circumferentially spaced-apart struts, the gap configured to axially span over at least a portion of each respective interface, the circumferentially segmented heat shield shielding the shroud from the bypass flow of air flowing through the bypass passage.

8. The exhaust casing as defined in claim 7, wherein the circumferentially segmented heat shield is circumferentially segmented into at least three separate segments about the shroud, the at least three separate segments are circumferentially equidistant from each other.

9. The exhaust casing as defined in claim 7, wherein the circumferentially segmented heat shield has a thickness measured radially relative to the longitudinal axis, the thickness is at least 20 thou and at most 40 thou.

\* \* \* \* \*